US010360071B1

(12) United States Patent
Moses et al.

(10) Patent No.: US 10,360,071 B1
(45) Date of Patent: Jul. 23, 2019

(54) COMPUTING RESOURCE MARKET

(71) Applicant: Amazon Technologies, Inc., Reno, NV (US)

(72) Inventors: Carl Jay Moses, Nokesville, VA (US); Thomas Charles Stickle, Saint James, NY (US)

(73) Assignee: Amazon Technologies, Inc., Seattle, WA (US)

( * ) Notice: Subject to any disclaimer, the term of this patent is extended or adjusted under 35 U.S.C. 154(b) by 1201 days.

(21) Appl. No.: 14/251,491

(22) Filed: Apr. 11, 2014

(51) Int. Cl.
*G06F 9/50* (2006.01)
*H04L 29/08* (2006.01)
*H04L 29/06* (2006.01)

(52) U.S. Cl.
CPC .......... *G06F 9/5061* (2013.01); *G06F 9/5072* (2013.01); *H04L 67/104* (2013.01); *H04L 67/1014* (2013.01); *H04L 67/30* (2013.01); *H04L 67/42* (2013.01)

(58) Field of Classification Search
CPC ..... G06Q 30/06; G06Q 30/0601–0643; G06Q 30/08; H04L 67/00–42; G06F 1/00; G06F 3/00; G06F 9/5072; G06F 11/3006; G06F 17/00; G06F 17/10–18
See application file for complete search history.

(56) References Cited

U.S. PATENT DOCUMENTS

| 9,485,323 | B1* | 11/2016 | Stickle | H04L 67/32 |
| 2002/0091612 | A1* | 7/2002 | Greene | G06Q 40/04 |
| | | | | 705/37 |
| 2010/0131624 | A1* | 5/2010 | Ferris | G06F 9/5072 |
| | | | | 709/221 |
| 2010/0332262 | A1* | 12/2010 | Horvitz | G06F 9/5027 |
| | | | | 705/4 |
| 2011/0119191 | A1* | 5/2011 | Stern | G06F 9/45533 |
| | | | | 705/59 |
| 2011/0161496 | A1* | 6/2011 | Nicklin | G06Q 30/06 |
| | | | | 709/226 |
| 2012/0016721 | A1* | 1/2012 | Weinman | G06Q 10/06 |
| | | | | 705/7.35 |
| 2012/0110055 | A1* | 5/2012 | Van Biljon | G06Q 30/04 |
| | | | | 709/201 |
| 2012/0131591 | A1* | 5/2012 | Moorthi | G06Q 10/06 |
| | | | | 718/104 |
| 2012/0198073 | A1* | 8/2012 | Srikanth | G06F 9/5027 |
| | | | | 709/226 |

(Continued)

OTHER PUBLICATIONS

TechTarget Network. Margaret Rouse. Definition: control plane. https://searchsdn.techtarget.com/definition/control-plane-CP. Mar. 2013. (Year: 2013).*

*Primary Examiner* — William J Allen
(74) *Attorney, Agent, or Firm* — Thorpe North & Western, LLP.

(57) ABSTRACT

A technology is described for an electronic market for network-accessible computing resources located on a partner-owned data center that is external to a service provider network. An example method may include receiving a request for a network-accessible computing resource from a customer of a computing service provider. A network-accessible computing resource may then be identified on a partner-owned data center as specified in the request. A network connection may then be established that allows the customer to access the network-accessible computing resource.

20 Claims, 10 Drawing Sheets

(56) References Cited

U.S. PATENT DOCUMENTS

| | | | | |
|---|---|---|---|---|
| 2013/0031028 A1* | 1/2013 | Martin | ................... | G06Q 30/08 |
| | | | | 705/400 |
| 2013/0111027 A1* | 5/2013 | Milojicic | .............. | G06F 9/5077 |
| | | | | 709/225 |
| 2014/0067496 A1* | 3/2014 | Buswell | ................. | G06Q 30/08 |
| | | | | 705/14.4 |
| 2014/0089658 A1* | 3/2014 | Raghuram | ............ | H04L 9/0825 |
| | | | | 713/155 |
| 2014/0173112 A1* | 6/2014 | Seago | ..................... | H04L 67/32 |
| | | | | 709/226 |
| 2014/0279201 A1* | 9/2014 | Iyoob | ................ | G06Q 30/0631 |
| | | | | 705/26.7 |
| 2015/0012977 A1* | 1/2015 | Huh | ....................... | G06F 9/468 |
| | | | | 726/4 |
| 2015/0089034 A1* | 3/2015 | Stickle | ................... | H04L 41/00 |
| | | | | 709/223 |
| 2015/0124608 A1* | 5/2015 | Agarwal | .............. | H04L 47/122 |
| | | | | 370/235 |

* cited by examiner

COMPUTING RESOURCE MARKET

BACKGROUND

The advent of virtualization technologies for commodity computer hardware has provided benefits with respect to managing large-scale computing resources for many customers with diverse needs and has allowed various computing resources to be efficiently and securely shared by multiple customers. For example, virtualization technologies may allow a single physical computing machine to be shared among multiple customers by providing each customer with one or more virtual machines hosted by the single physical computing machine, with each virtual machine or computing instance being a software simulation acting as a distinct logical computing system that provides customers with the perception that the customers are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

Businesses that operate data centers may interconnect computing systems included in the businesses' data centers with a virtualized computing service network operated by a computing service provider to support the businesses' operations. For example, the computing systems of both parties may be co-located (e.g., as part of a local network) or instead located in multiple distinct geographical locations (e.g., connected via one or more private or public intermediate networks). Interconnecting a businesses' data center with a virtualized computing service may result in a type of partnership between a service provider and a business, thereby exposing the computing resources owned by each party to be utilized for various applications.

DETAILED DESCRIPTION

Figure 1:
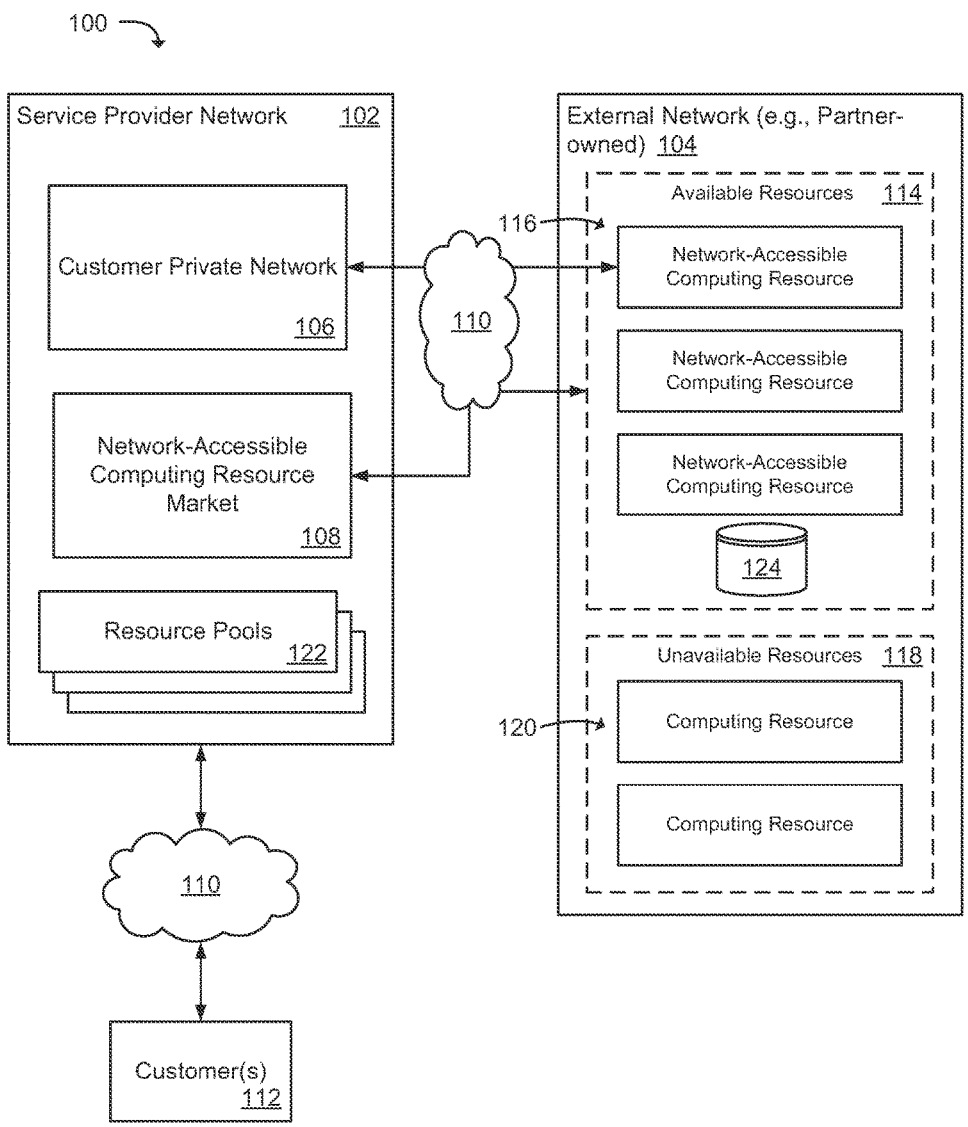
FIG. 1 is a diagram illustrating an example system for an electronic market in which network-accessible computing resources located on an external network are made available to a customer.

A technology is described for an electronic market for network-accessible computing resources. The electronic market may offer network-accessible computing resources located in a partner-owned data center to customers of a computing service provider. Examples of computing services in a partner-owned data center that may be available to a customer via a network-accessible computing resource purchased from the market may include, but are not limited to, computing services using computing instances, a block-level storage service, a storage service implementing a web-services interface for partner operations, a database service, a batch-processing parallel computing service, a load-balancing service or other computing services. In one example configuration, a partner (e.g., a business or other organization) may register network-accessible computing resources located in a partner-owned data center with a service provider network. Registering the partner-owned data center with the service provider network may expose (e.g., make available) the network-accessible computing resources to the service provider network. The partner may also make the network-accessible computing resources available to an electronic market for computing services offered by a computing service provider. For example, a partner having unused network-accessible computing resources (e.g., idle computing capacity) may make the network-accessible computing resources available to the customers of the computing service provider via an electronic marketplace provided by the computing service provider. By way of the marketplace, a customer may purchase or bid on a network-accessible computing resource, and if successful, may utilize the network-accessible computing resource for a specified period of time.

In one example configuration, a partner may identify computing capacity within a partner-owned data center that the partner wants to make available to a market for network accessible computing resources. In some cases, the partner-owned data center may be external to a service provider network data center, but may be linked to the service provider network via a communications network (e.g. a hardware linked VPN (virtual private network)). Using a partner interface provided by the service provider network, the partner may select network-accessible computing resources located at the partner-owned data center to partition from a remainder of computing resources at the partner-owned data center. The network-accessible computing resources selected may be made available to the market, thereby making the network-accessible computing resources available to customers of the computing service provider for a duration specified by the partner.

Purchasing the network-accessible computing resource may establish a customer-partner relationship associated with the network-accessible computing resource, where the customer-partner relationship may be governed by certain terms and conditions that include, for example, a specified duration of the customer-partner relationship, during which the customer may utilize the network-accessible computing resource.

FIG. 1 is a block diagram illustrating a high level example of a system 100 for a network-accessible computing resource market. The system 100 may include an external network 104 (e.g., a partner-owned and/or partner-managed) that may be in communication with a service provider network 102 via a communications network 110 (e.g., the Internet and/or other networks). The service provider network 102 may be operated by a computing service provider. An external network 104 may include an available computing resource set 114 and an unavailable computing resource set 118. An available computing resource set 114 may contain network-accessible computing resources 116 that a partner has identified as being available to a customer 112 of a computing service provider for a specified duration. For example, a partner may register a network-accessible computing resource 116 located at the partner-owned data center with a service provider network 102 by requesting that a network connection be established between a network-accessible computing resource set 118 and a service provider network 102 via a service provider administrative resource.

A common control-plane (e.g., that may be accessible to customers 112 and partners) may be used to manage network-accessible computing resources 116 within the external network 104. Control operation requests may be submitted using a common control-plane interface that allows a partner, or a customer 112, to manage and control the various computing resources located within the service provider network 102 and/or within the external network 104 via the common control-plane interface, which is described in greater detail in association with FIG. 3.

An unavailable computing resource set 118 may contain unavailable or occupied computing resources 120 (e.g., partner reserved resources) partitioned from network-accessible computing resources 116 registered with the service provider network 102. For instance, a partner may utilize the unavailable computing resources 120 to perform various functions associated with the partner's operations. The network-accessible computing resources 116, in one example, may be partitioned by creating a subnet that contains the network-accessible computing resources 116, thereby separating the network-accessible computing resources 116 from the unavailable computing resources 120. It is noted that not all computing resources in an external network 104 need be owned by a partner. For example, a partner may lease computing resources located at a third party's premises outside the external network 104, and such leased computing resources may also be considered part of the external network 104.

Prior to making the network-accessible computing resources 116 available to customers 112 via an electronic market, the computing service provider may request that the partner complete a survey or audit of the external network 104 containing the network-accessible computing resources 116 to ensure that the external network 104 meets specified compliance standards as verified by the computing service provider. For example, a partner may provide evidence that the partner's data center was subjected to an industry accepted audit, such as Statement on Auditing Standards (SAS) 70, Statement on Standards for Attestation Engagements (SSAE) 16, Service Organization Controls (SOC) 2, Service Organization Controls (SOC) 3 and the like. As an illustration, a partner may provide a computing service provider with an audit report detailing the scope of the audit, thereby providing evidence that the partner's external network 104 complies with the computing service provider's standards. In one example, a computing service provider may electronically audit an external network 104 via electronic agents (e.g., internal and/or external) that collect various data about the external network 104 and report back to an auditing module located on a service provider network 102.

The service provider network 102 may include numerous data centers (which may be distributed across different geographical regions) hosting various resource pools 122, such as collections of physical and/or virtualized computer servers, storage servers with one or more storage devices each, networking equipment and the like, used to implement, configure and distribute an infrastructure, services and applications offered by a computing service provider. A number of different hardware and/or software components, some of which may be instantiated or executed at different data centers or in different geographical regions, may collectively be used to implement each of the services offered by the computing service provider.

In one example configuration, a service provider network 102 may include a network-accessible computing resource market 108 that may be accessible to a customer 112 via a network-accessible console or other interface type. Customers 112 of a computing service provider may access a computing resource marketplace via the network-accessible computing resource market 108 to view listings for network-accessible computing resources (e.g., computing instances, storage, applications, networking services, etc.) that may be available to a customer 112 to purchase. A network-accessible computing resource offered by way of the computing resource marketplace may be available to purchase (i.e., lease) for a specified duration, or for some other type of tenancy (e.g., week-to-week, month-to-month, etc.). A customer 112 may select an available network-accessible computing resource, agree to any terms associated with the network-accessible computing resource, and then the customer may be connected to the network-accessible computing resource 116 so that the customer 112 may utilize the network-accessible computing resource 116 according to the terms.

In one example, a customer 112 may be provided with a marketplace GUI (Graphical User Interface) as an interface from the network-accessible computing resource market 108, enabling the customer 112 to request (purchase) a network-accessible computing resource 116 via the marketplace GUI. For example, the marketplace GUI may display listings for available network-accessible computing resources 116 that may include terms associated with a network-accessible computing resource 116, as well as pricing information. Using the marketplace GUI, a customer 112 may view listings for network-accessible computing resources, select a network-accessible computing resource 116 that meets the customer's requirements, bid on or purchase the network-accessible computing resource 116 and then finalize the transaction.

In one example, a customer 112 may specify a machine image configuration (e.g., a machine image) to install as a computing service on a network-accessible computing resource 116 when bidding or purchasing for the network-accessible computing resource 116. A machine image configuration may comprise software that includes an operating system and applications that may be executed by a network-accessible computing resource 116. For example, the machine image may execute as a computing instance on a hypervisor on a hardware substrate. In some example use cases, a machine image configuration may be transmitted from a service provider network 102 to a destination storage device 124 at the external network 104, where an installable version of one or more modules of a machine image configuration may be cached on the external network 104 and made available for installation on a network-accessible computing resource 116.

After purchasing a network-accessible computing resource 116, a customer 112 may be provided with a network connection that allows the customer 112 to access and utilize the network-accessible computing resource 116. For example, a customer 112 of a computing service provider may be provided with a customer private network 106 (e.g., a virtual private cloud) giving the customer 112 access to computing resources offered by the computing service provider. A network connection may be established between a network-accessible computing resource(s) 116 purchased by the customer 112 and the customer private network 106, enabling the customer 112 to access the network-accessible computing resource 116.

Figure 2:
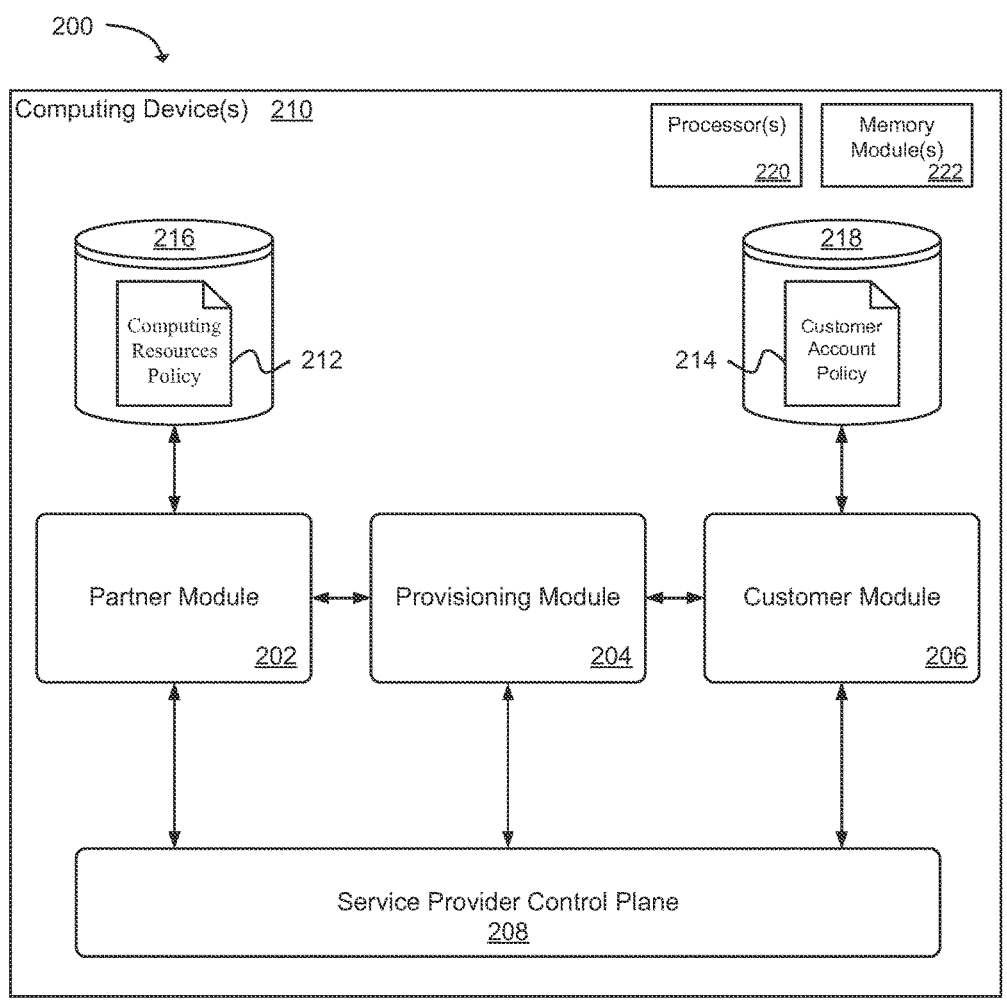
FIG. 2 is a block diagram that illustrates an example network-accessible computing resources market showing various components of the network-accessible computing resource market.

FIG. 2 illustrates an example of system components in a network-accessible computing resources market 200 (illustrated as 108 in FIG. 1) on which the present technology may be executed. In one example configuration, the network-accessible computing resources market 200 may include one or more computing devices 210 executing a provisioning module 204 that may be in communication with a partner module 202 and a customer module 206 as well as other services, processes, systems, engines, or functionality not discussed in detail herein. The provisioning module 204 may be accessed via a service provider control-plane 208 allowing requests to be submitted to the partner module 202 and/or the customer module 206 using a set of interfaces (e.g., consoles or APIs (Application Program Interfaces)) by a customer or a partner.

The partner module 202 may be used to manage a computing resources policy 212 for computing resources included in a partner-owned data center. For example, the computing resources policy 212 may apply to a number of network-accessible computing resources located at the partner-owned data center and the computing resources policy 212 may specify network-accessible computing resource types at the partner-owned data center that may be available for use by customers and specify any terms associated with a customer using a network-accessible computing resource. A partner may manage the computing resources policy 212 via the partner module 202. The computing resources policy 212 may be stored in a data store 216 accessible to the partner module 202. In one example configuration, the partner module 202 may implement a network accessible partner GUI (e.g., a web based GUI) having functionality that enables a partner to partition the computing resources of a partner-owned data center, specify network-accessible computing resources available to customers of a computing service provider, and reserve the remaining computing resources of the partner-owned data center for partner operations.

When partitioning computing resources of a partner-owned data center, a partner may reserve storage to cache machine image configurations (e.g., machine images) that may be installed and executed on a network-accessible computing resource. Caching machine image configurations on a partner-owned data center may avoid a latency associated with transferring a machine image configuration from a service provider data center to a partner-owned data center. For example, when loading a computing service on a network-accessible computing resource, a machine image specified by a customer may be retrieved from a cache located in the reserved storage on the partner-owned data center rather than transferring the machine image from a service provider data center. In addition, a partner may reserve storage resources (e.g., block storage) within the partner-owned data center to support data processing and data transfer operations associated with executing a customer's network-accessible computing resource.

In one example, in addition to partitioning information, a computing resources policy 212 may include partner defined customer specifications. For example, a partner may specify customer requirements for customers wishing to utilize network accessible resources located within the partner's data center. For example, a partner may specify that a customer's operations (e.g., business) be located within a specific geographic origin in order to comply with various laws and/or regulations. A computing resources policy 212 may also include terms and conditions as defined by a partner. For example, the terms and conditions may specify: a duration of a partner-customer relationship associated with a network-accessible computing resource, certain types of activities that may not be performed using the network-accessible computing resource (e.g., a prohibition of using a network-accessible computing resource for illegal activities), a partner's duty to maintain computing resources in relation to a network-accessible computing resource, as well as any other term and/or condition that may be made part of a computing resources polity 212.

The customer module 206 may be used to manage a customer account policy 214 for one or more network-accessible computing resources located at partner-owned data centers. Various aspects of a customer-partner relationship may be managed via the customer account policy 214, as well as certain aspects of a network-accessible computing resource associated with the customer-partner relationship. For example, the customer account policy 214 may identify network-accessible computing resources owned by a customer according to a customer-partner relationship agreement. A customer may access and modify the customer account policy 214 via the customer module 206 as described below.

In one example configuration, the customer module 206 may implement a network accessible customer GUI (e.g., a web based GUI) that includes functionality that allows a customer to view information relating to the customer's network-accessible computing resources, as well as manage certain aspects of a customer account policy 214. For example, a customer may view inventory information for network-accessible computing resources owned by the customer, view the terms and conditions associated with a customer-partner relationship, view status information related to network-accessible computing resources owned by the customer.

Also, for example, a customer may use the customer GUI to manage various aspects of a customer account policy 214, such as the customer's account information (e.g., contact information, business information, payment information, etc.), manage aspects of a network-accessible computing resource utilized by the customer (e.g., manage a machine image configuration installed on a network-accessible computing resource), manage termination of a customer-partner relationship, etc. In addition, via the customer GUI, a customer may be provided with the ability to report issues related to one or more network-accessible computing resources to a partner and/or a computing service provider. For example, problems related to accessing a network-accessible computing resource (e.g., networking issues), hardware outages, as well as any other issue related to the customer's network-accessible computing resource.

The provisioning module 204 may be used to identify network-accessible computing resources available from a partner and provision one or more of the network-accessible computing resources to a customer of a computing service provider. In one example configuration, the provisioning module 204 may expose a provisioning interface that enables a customer of a computing service provider to request a network-accessible computing resource located at a partner-owned data center. For example, the provisioning interface may provide access to a marketplace for network-accessible computing resources that may match customers with available network-accessible computing resources, and then provision a purchased network-accessible computing resource to a customer. The provisioning module 204 may be accessible by way of a service provider control pane 208.

A customer request to purchase a network-accessible computing resource may be received via the provisioning interface exposed by the provisioning module 204. In one example, the provisioning interface may include a provisioning GUI that displays a list of network-accessible computing resources available for lease. For example, network-accessible computing resources located within one or more partner-owned data centers may be identified along with terms of a customer-partner relationship associated with the network-accessible computing resources, and a list of the network-accessible computing resources may be displayed in the provisioning GUI. The customer may select a network-accessible computing resource from the list of network-accessible computing resources and, in one example, offer a bid amount for the network-accessible computing resource subject to any terms and conditions associated with the network-accessible computing resource. Alternatively, a customer may purchase a network-accessible computing resource (as opposed to bidding) according to any terms and conditions associated with the network-accessible computing resource.

Upon purchasing a network-accessible computing resource, the provisioning module 204 may be used to provision the network-accessible computing resource to a customer via the service provider control plane 208. In one example, provisioning a network-accessible computing resource to a customer may include establishing a network connection between a customer's private network (e.g., a customer's virtual private cloud) and a network-accessible computing resource purchased by the customer, enabling the customer to control the network-accessible computing resource.

The various processes and/or other functionality contained on the computing device 210 may be executed on one or more processors 220 that are in communication with one or more memory modules 222 according to various examples. The computing device 210 may comprise, for example, of a server or any other system providing computing capability. Alternatively, a number of computing devices 210 may be employed that are arranged, for example, in one or more server banks or computer banks or other arrangements. For purposes of convenience, the computing device 210 may have been referred to in the singular. However, it is understood that a plurality of computing devices 210 may be employed in the various arrangements as described above.

A computing resources policy 212 and a customer account policy 214 may be stored in a data store 216 and 218 that are accessible to the partner module 202 and the customer module 206 respectively. The term "data store" may refer to any device or combination of devices capable of storing, accessing, organizing and/or retrieving data, which may include any combination and number of data servers, relational databases, object oriented databases, cloud storage systems, data storage devices, flat files and data storage configuration in any centralized, distributed, or clustered environment. The storage system components of the data stores 216 and 218 may include storage systems such as a SAN (Storage Area Network), cloud storage network, volatile or non-volatile RAM, optical media, or hard-drive type media. The data stores 216 and 218 may be representative of a plurality of data stores as can be appreciated.

The modules included in the network-accessible computing resources market 200 may be in communication by way of an interconnected network that may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, cloud, grid or cluster computing system. An API may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
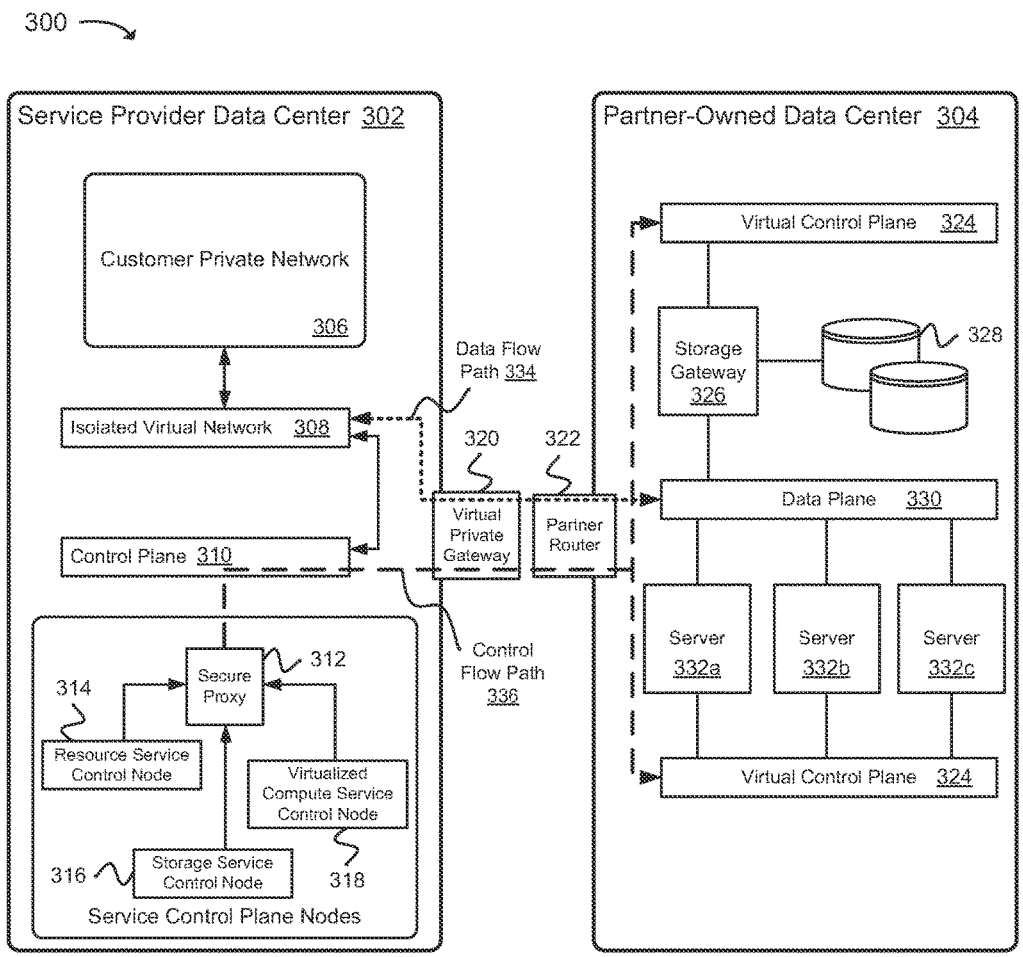
FIG. 3 is a block diagram illustrating an example of a control flow path and a data flow path between a service provider network data center and an external partner-owned data center.

FIG. 3 is a block diagram illustrating an example of a system 300 showing a data flow path 334 and a control flow path 336 between a service provider data center 302 and a partner-owned data center 304 (e.g., an external data center). Generally speaking, network traffic flowing between various components of a service provider data center 302 and a partner-owned data center 304 may be classified into two broad categories: data traffic and control traffic. Data traffic may include network transfers associated with various customer applications, such as transferring contents of an electronic page (e.g., a web page) from an electronic site (e.g., web site) instantiated at a virtualized computing server within the service provider data center 302 in response to an HTTP (Hypertext Transfer Protocol) request from a client device.

Control traffic may include network transfers associated with administrative tasks, such as configuration change commands transmitted from a controller device to a virtualized computing server, and the like. For security, performance, and other reasons, data traffic and control traffic may be kept logically isolated from each other as much as possible in at least some examples (although in at least some cases, network routes or links may be shared for both types of traffic). Accordingly, at least a subset of the resources and infrastructure components of a service provider data center 302 and a partner-owned data center 304 may be grouped into two categories in some examples. For example, a control plane 310, that extends to a virtual control plane 324 on the partner-owned data center, and a data plane 330, used respectively for the flow of data traffic and the flow of control traffic between the service provider data center 302 and the partner-owned data center 304. Each plane (i.e., the control plane 310 and the data plane 330) may comprise a number of different types of resources, including for example, networking devices such as routers, gateways, switches, and the like, networking links, storage devices and/or servers.

An isolated virtual network 308 may be set up using a subset of service provider data center 302 resources on behalf of a customer. The isolated virtual network 308 may be logically isolated from other service provider data center 302 resources (including other isolated virtual networks). A data flow path 334 between the isolated virtual network 308 and a partner-owned data center 304 may be established. The data flow path 334 may include a virtual private gateway 320 set up for the customer's network traffic, as well as a router 322 associated with the partner-owned data center 304. A data flow path may include: network links between the isolated virtual network 308 and the virtual private gateway 320, network links between the virtual private gateway 320 and router 322, and network links within the partner-owned data center 304.

Control operation requests transmitted by a customer using service provider control interfaces may be handled by various service control-plane nodes. For example, a virtualized computing service control node 318 may handle control operations related to a virtualized computing service, a storage service control node 316 may handle control operations related to a storage service, and a resource service control node 314 may handle control operations related to pooled-resource services such as a load balancing service or a distributed caching service. The service control-plane nodes (i.e., 314, 316 and 318) associated with a given service may be collectively referred to "service control-plane nodes" below. Although FIG. 3 shows three service control-plane nodes, additional service-control plane nodes for services not specified here are contemplated to be within the scope of this disclosure.

A partner affiliated with a computing service provider may register resources of a partner-owned data center 304 with the service provider data center 302. For example, a partner may request to register a particular network-accessible computing resource located at a partner-owned data center (e.g., an external data center) with a service provider data center 302 making the network-accessible computing resource available to a customer of a computing service provider. In some examples, one or more capabilities of the particular resource may be verified (e.g., by communicating with one or more management software stack components installed at the partner-owned data center 304). For example, if the particular resource comprises a virtualization host at which one or more virtualized computing servers or instances are to be set up, a registration manager may verify that the virtualization management software stack at the particular resource may be capable of responding to the kinds of control operation requests (such as requests to start or stop computing instances) that may be issued to initiate similar operations at the service provider data center 302.

In addition to a verification of compatibility with programmatic control interfaces of the service provider data center 302, other aspects of a resource located at the partner-owned data center 304 may also be verified (e.g., performance capabilities may be checked to ensure that a resource can support desired workload levels, security capabilities may be checked, and so on.). In some examples, one or more modules of virtualization management software (e.g., hypervisor components, or administrative operating system components) may be installed at the partner-owned data center 304 prior to a resource being registered for control via the service provider data center's control plane 310. The modules of the virtualization management software may be installed, for example, to ensure compatibility with the service provider data center's interfaces, to allow resources monitoring in a manner similar to the way the service provider data center's resources are monitored, etc.

As shown in FIG. 3, servers 332a-c may have each been registered for control via the service control-plane nodes (i.e., 314, 316 and 318). The servers 332a-c may include network-accessible computing resources, such as a computing service, a block-level storage service, a storage service, a database service, a batch-processing parallel computing service, a load-balancing service or other computing services. Network-accessible computing resources included on the registered servers 332a-c may be controlled by way of control operation requests that originate from a service control-plane node along a control flow path 336 to one or more virtual control planes 324. In the same way, storage 328 located on the partner-owned data center 304 may be registered with the service provider data center 302 and may be controlled via the computing service's control-plane nodes and a storage gateway 326.

The control flow path 336 may be established between the service control-plane nodes 310 located within the service provider data center 302 and the virtual control plane 324 within the partner-owned data center 304. The control flow path 336 may be secured using encryption-based protocols such as, IPSec (Internet Protocol Security), TLS (Transport Layer Security), or SSL (Secure Sockets Layer), securing the connections between the service provider-side service control-plane nodes and the partner-side virtual control plane 324. The control flow path may include a secure proxy 312, such as an IPSec proxy, in some examples. At least in some examples, control traffic may be kept isolated from data traffic using any of various network isolation techniques, such as various kinds of VPN (Virtual Private Network) protocols or a dedicated hardware VPN.

In one example, upon a customer purchasing a network-accessible computing resource located on the partner-owned data center 304, access to an isolated virtual network 308 on the service provider data center 302 that connects to the partner-owned data center may be established for a customer private network 306. The customer may then send control operation requests to the network-accessible computing resource, where a control operation request may be sent from a service control-plane node (i.e., 314, 316 or 318) along the control flow path 336 where the control operation request may be received by the virtual control plane 324 and relayed to the network-accessible computing resource. Data traffic for the network-accessible computing resource may be transmitted between a data plane 330 on the customer private network 306 along the data flow path 334. After the termination of a customer-partner relationship, a customer's access to a network-accessible computing resource may be removed by tearing down the connection between the customer private network 306 and the isolated virtual network 308 connecting the service provider data center 302 to the partner-owned data center 304.

Figure 4:
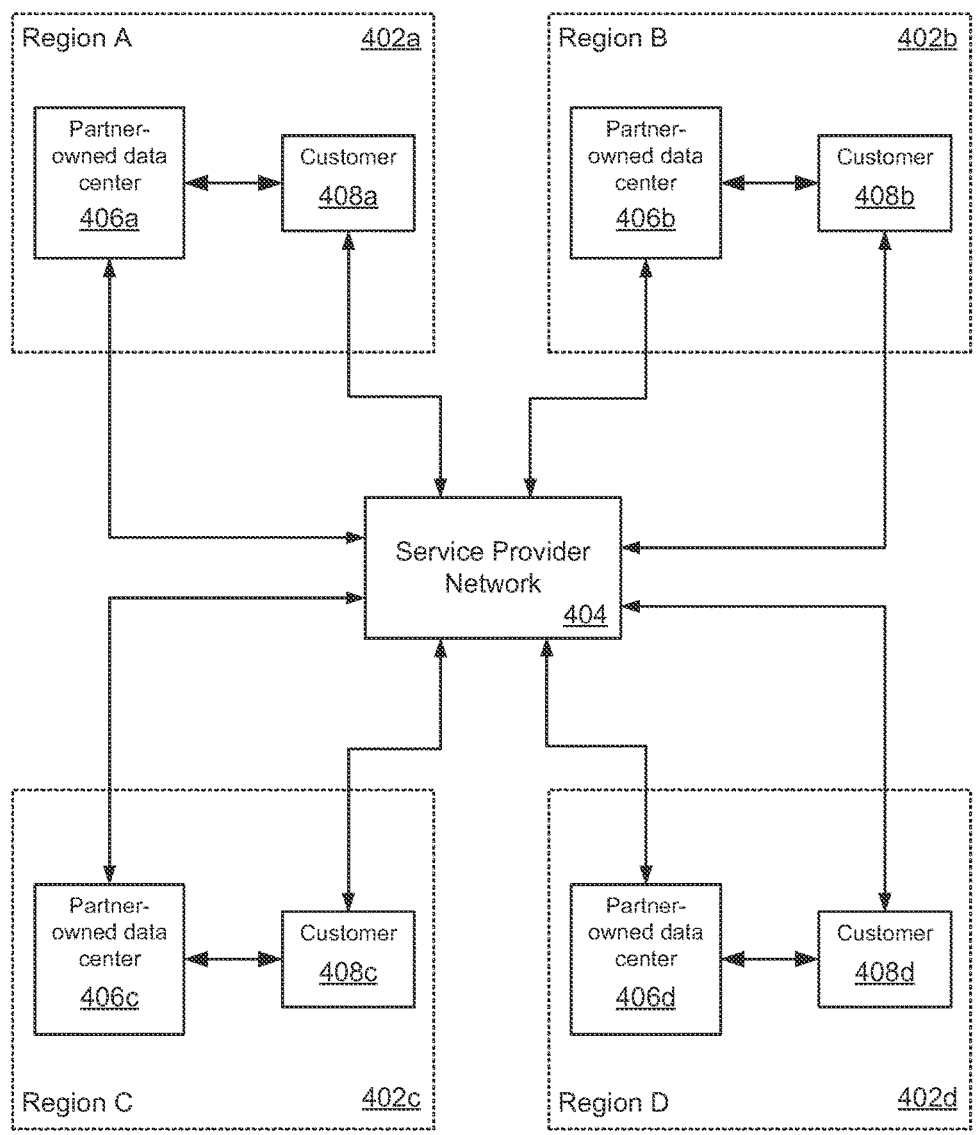
FIG. 4 is a block diagram illustrating an example of relationships between a service provider network and a plurality of partner-owned data centers across various regions.

FIG. 4 is a block diagram illustrating an example of relationships that may be established between a computing service provider and a partner within various geographical regions. As shown, a service provider network 404 may be connected to a number of partner-owned data centers 406a-d. Each partner-owned data center 406a-d may be located in a geographical region that may be different from the service provider network 404. A partner-owned data center 406a-d may be connected to the service provider network 404 via a secured isolated virtual network as described earlier.

Customers 408a-d of the computing service provider may purchase a network-accessible computing resource located at a partner-owned data center 406a-d for a defined duration. Further, a customer 408a-d may be able to select a network-accessible computing resource located at a partner-owned data center 406a-d that is within the same geographical region as the customer.

In one example, rather than routing network traffic associated with a network-accessible computing resource through a service provider network 404, a customer may be provided with direct network connection or a virtual private network (VPN) connection that links the customer to a partner-owned data center 406a-d after the network-accessible computing resource is purchased by the customer. Establishing the network configuration may involve installation of service control-plane nodes (e.g., a virtualized computing service control node, a resource service control node and/or a storage service control node) on the partner-owned data center 406a-d.

As an illustration, a customer 408a-d located in a northeastern United States region may be able to purchase a network-accessible computing resource located at a partner-owned data center 406a-d that is also located in the northeastern United States region by way of a computing service provider having a relationship with the partner-owned data center 406a-d. As a result, after purchasing the network-accessible computing resource, a direct network connection to the partner-owned data center 406a-d may be implemented for the customer 408a-d, thereby reducing a latency that may be associated with network connections spanning greater geographical distances where the service provider network 404 may be located.

Partnering with data centers located in various geographical regions may allow a computing service provider to expand the presence of the computing service provider's business to areas where the computing service provider may not have a service provider network data center. As such, a customer may establish a customer-partner relationship with a partner-owned data center 406a-b via the computing service provider's infrastructure. For example, the computing service provider may implement a market for network-accessible computing resources that may be available to the computing service provider's customers. By way of the market, a customer can search for and purchase a network-accessible computing resource that is located within the customer's own geographical region. For example, an electronic marketplace (e.g., a marketplace web page) may provide listings of available network-accessible computing resources that include geographical locations for the available network-accessible computing resources, and a customer may select one or more network-accessible computing resources located in the customer's region.

Figure 5A:
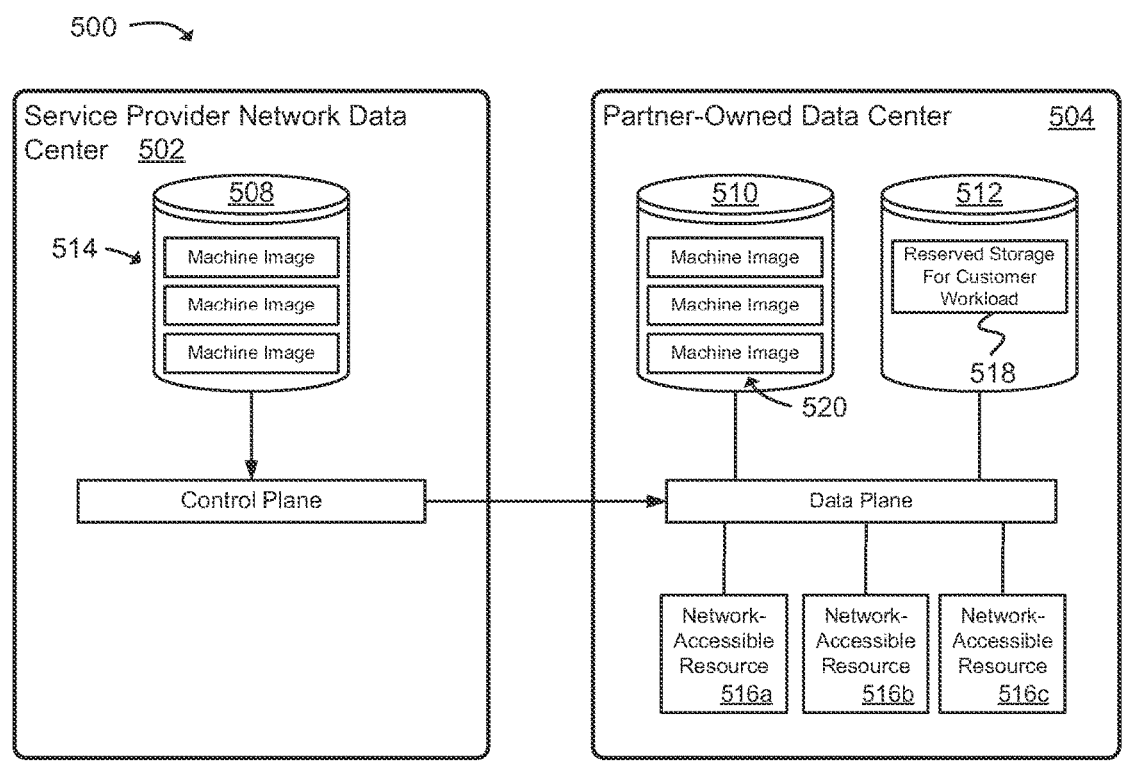
FIG. 5a is a block diagram that illustrates an example system in which storage is reserved in a partner-owned data center to cache application stacks and accommodate data operations associated with a customer's network-accessible computing resource.

FIG. 5a is a block diagram illustrating example components 500 of a service provider network data center 502 and a partner-owned data center 504. The service provider network data center 502 may include a data store 508 containing a number of machine image configurations 514 that may be executed on a network-accessible computing resource 516a-c located in the partner-owned data center 504. In establishing a relationship with a computing service provider, a partner may, in combination with making network-accessible computing resources available to customers of a computing service provider, set aside (i.e., reserve) storage to store application stacks 520 that may be used to execute a service (e.g., a computing service or computing instance, a block-level storage service, a storage service implementing a web-services interface for customer operations, a database service, a batch-processing parallel computing service, a load-balancing service, etc.).

A machine image, in one example, may be a configuration of various software to create a machine image. When loaded onto a network-accessible computing resource 516a-c, execution of the machine image provides a customer with a particular service offered by a computing service provider. Reserving storage on a data store 510 located in the partner-owned data center 504 and caching application stacks 520 on the data store 510 may allow for faster initiation of a service, as opposed to transferring a machine image 514 from a data store 508 in a service provider network 502 to a partner-owned data center 504 when requested. As an illustration, subsequent to establishing a partner-computing service provider relationship, frequently used application stacks 514 may be transmitted from a data store 508 in a service provider network 502 to a data store 510 in a partner-owned data center 504, where the application stacks 520 may be readily available to load onto a network-accessible computing resource 516a-c.

Storage 518 in a partner-owned data center 504 may be set aside to support data processing and data transfer operations associated with a network-accessible computing resource 516a-c utilized by a customer. For example, a data store 512 may be designated to support a workload associated with a customer's network-accessible computing resources 516a-c, or storage 518 within the data store 512 may be reserved to support data operations associated with the network-accessible computing resource 516a-c. The storage 518 may be accessible to one or more servers 516a-c executing network-accessible computing resources 516a-c. Although two data stores 510 and 512 are depicted, the data stores 510 and 512 may be representative of a single data store or a plurality of data stores as can be appreciated. The storage system components of the data stores 510 and 512 may include storage systems such as a SAN (Storage Area Network), volatile or non-volatile RAM, hard-drive type media, or the like.

Figure 5B:
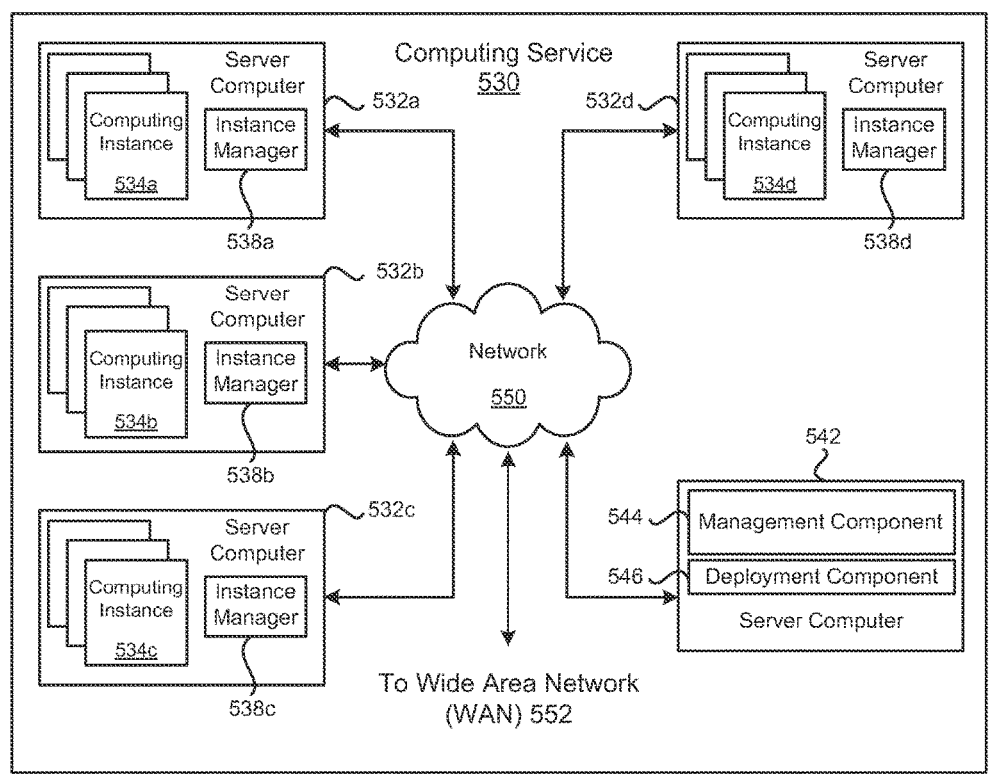
FIG. 5b is a block diagram that illustrates an example computing service environment that includes network-accessible computing resources executing computing instances.

FIG. 5b is a block diagram illustrating an example use case in which network-accessible computing resources may be used to execute a computing service 530. The computing service 530 may execute and manage a number of computing instances 534a-d. In particular, the computing service 530 depicted illustrates one environment for which a network accessible computing resources located in a partner-owned data center may be used. The computing service 530 may be one type of environment that includes various virtualized service resources that may be used, for instance, to host computing instances 534a-d.

The particularly illustrated computing service 530 may include a plurality of server computers 532a-d. While four server computers are shown, any number may be used, and large partner-owned data centers may include thousands of server computers. The computing service 530 may provide computing resources for executing computing instances 534a-d. Computing instances 534a-d may, for example, be virtual machines. A virtual machine may be an instance of a software implementation of a machine (i.e. a computer) that executes applications like a physical machine. In the example of a virtual machine, each of the server computers 532*a-d* may be configured to execute an instance manager 538*a-d* capable of executing the instances. The instance manager 538*a-d* may be a hypervisor, virtual machine monitor (VMM), or another type of program configured to enable the execution of multiple computing instances 534*a-d* on a single server. Additionally, each of the computing instances 534*a-d* may be configured to execute one or more applications.

In one example, a server computer 542 may be reserved to execute software components for managing the operation of the computing service 530 and the computing instances 534*a-d* from the partner-owned data center (as opposed to managing the operation of the computing service 530 from a service provider network). For example, a server computer 542 may execute a management component 544. A customer may access the management component 544 to configure various aspects of the operation of the computing instances 534*a-d*. For example, the customer may setup computing instances 534*a-d* and make changes to the configuration of the computing instances 534*a-d*.

A deployment component 546 may be used to assist customers in the deployment of computing instances 534*a-d*. The deployment component 546 may receive a machine image configuration from a customer that includes data describing how computing instances 534*a-d* may be configured. For example, the machine image configuration may include an operating system, provide one or more applications to be installed in computing instances 534*a-d*, provide scripts and/or other types of code to be executed for configuring computing instances 534*a-d*, and other types of information. The deployment component 546 may utilize the customer-provided machine image configuration to configure, prime, and launch computing instances 534*a-d*. The machine image configuration, and other information may be specified by a customer accessing the management component 544 or by providing this information directly to the deployment component 546.

A network 550 may be utilized to interconnect the computing service 530 and the server computers 532*a-d* and 542. The network 550 may be a local area network (LAN) and may be connected to a Wide Area Network (WAN) 552 or the Internet, so that customers may access the computing service 530 via a customer's private network (e.g., a virtual private cloud). The network topology illustrated in FIG. 5*b* has been simplified, many more networks and networking devices may be utilized to interconnect the various computing systems disclosed herein.

Figure 6:
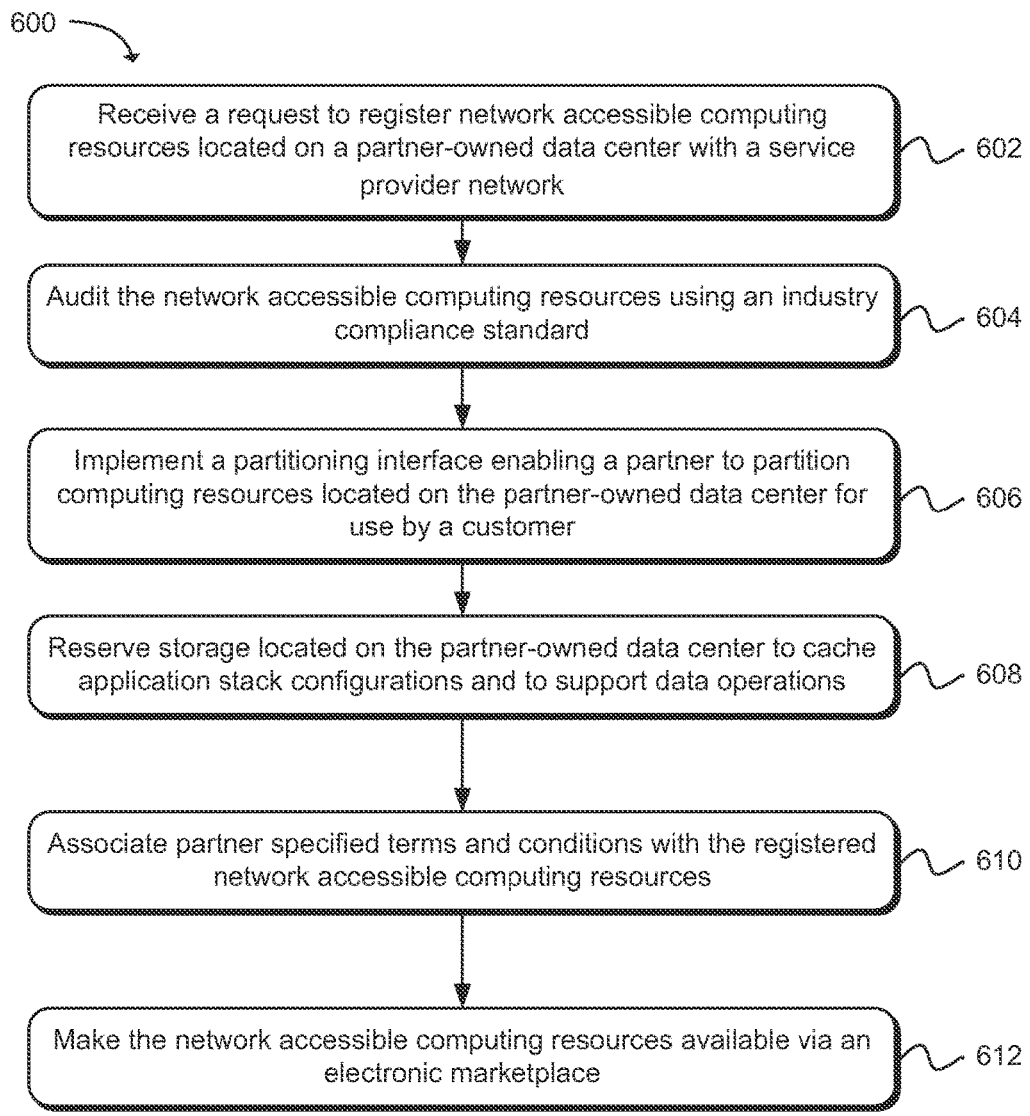
FIG. 6 is a flow diagram illustrating an example method for registering network-accessible computing resources with a service provider network and designating the network-accessible computing resources as available to customers via an electronic market.

Moving now to FIG. 6, a flow diagram illustrates an example method 600 for registering partner-owned network-accessible computing resources with a service provider network and making the network-accessible computing resource available to customers via a market. Starting in block 602, a request may be received by a computing service provider to register one or more network-accessible computing resources located on a partner-owned data center with a service provider network. Accordingly, a partner may submit the registration request, indicating that one or more network-accessible computing resources located at the partner-owned data center are to be registered and then controlled via control interfaces of the service provider network. A secure control-plane virtual connection (such as a VPN connection) may be established between an administrative node or control node of the service provider network (associated with one or more network-accessible services of the service provider network, and located within the service provider network) and one or more control modules (e.g., a virtual control plane) installed within the partner-owned data center (e.g., at the registered resources themselves, or on devices linked via network connections to the registered resources). Any appropriate secure networking protocol may be used for securing the connection, such as TLS, SSL, or IPSec. As illustrated in FIG. 3, a secure proxy may be used on the service provider network side (e.g., between the service control nodes and the virtual private gateway).

As in block 604, the network-accessible computing resources registered with the service provider network may be audited using an industry compliance standard or computing service provider standard. The audit, in one example, may be conducted by a third party and a resulting audit report may be provided to the computing service provider. The audit report may include information about the scope of the audit, from which the computing service provider may determine a level of compliance with computing service provider requirements. Audit information may be provided to a customer, enabling the customer to match the customer's compatibility and security specifications with the network-accessible computing resources being offered by the partner.

As in block 606, the computing service provider may implement a partitioning interface, such as an API, a web-based console, a command-line tool, or a graphical user interface, that enables a partner to view and partition network-accessible computing resources contained within the partner-owned data center that have been registered with the computing service provider. The partner may identify network-accessible computing resources that the partner may want to make available to customers of the computing service provider and partition the network-accessible computing resources from computing resources used in the partner's operations. The network-accessible computing resources may be leased to customers for a specified duration and may be subject to customer-partner relationship conditions set by the partner.

As an illustration, a partner may register computing resources included in a partner-owned data center with a service provider network managed by the computing service provider. Accordingly, the registered computing resources may be integrated into the service provider network via a network connection allowing the partner to utilize the registered computing resources in combination with services provided by the service provider network by way of control interfaces provided by the service provider network, as described earlier.

After registering network-accessible computing resources with the service provider network, there may be periods when a partner may not utilize certain registered computing resources. For example, the network-accessible computing resources may not be used at night, on weekends and/or on holidays by the partner of the service provider. As such, the partner may elect to auction the unused registered computing resources to the highest bidding customer for a defined period of time. In doing so, the partner may specify a term in which the partner will not utilize the registered computing resources.

In one example use case, a partner may designate a network-accessible computing resource as being available to a customer during a specified duration of a day (e.g., daytime or night-time) and reserve the network-accessible computing resource for the remaining duration of the day for the partner's operations. For example, a partner may need the network-accessible computing resource during a specific time of day to execute certain operations, such as to run a nightly batch process, but the partner may not need the network-accessible computing resource during the other times of the day. Accordingly, the partner may reserve the network-accessible computing resource during those hours that the partner may need the network-accessible computing resource (e.g., between 9:00 PM to 3:00 AM) and make the network-accessible computing resource available to a customer during the non-reserved hours (e.g., 3:01 AM to 8:59 PM).

Also, in another example use case, a network-accessible computing resource may be designated as having a utilization time that may be divided between a number of customers (e.g., between a first customer and a second customer). For example, utilization of the network-accessible computing resource may be divided between two customers for day use and night use. As an illustration, a first customer may conduct operations that actively utilize a network-accessible computing resource during day time hours (e.g., to conduct medical research), and a second customer may utilize the network-accessible computing resource during night time hours (e.g., to conduct automated batch operations).

As in block 608, storage located on the partner-owned data center may be reserved to cache machine image configurations and to support data operations as described in above in relation to FIG. 5. As in block 610, terms and conditions specified by the partner may be associated with the registered network-accessible computing resources. The terms and conditions may state a duration in which a customer may have access to a network-accessible computing resource and may state under what conditions a customer-partner relationship may be established (e.g., customer specifications that a partner may have, such as a specification that the customer's operations be located within the United States). The terms and conditions may be associated with a network-accessible computing resource, such that the terms and conditions may be viewable within a listing for a network-accessible computing resource allowing a customer to acquaint themselves with the terms and conditions. As in block 612, the network-accessible computing resources may be made available for purchase by customers of the computing service provider via an electronic marketplace interface, as described below.

Figure 7:
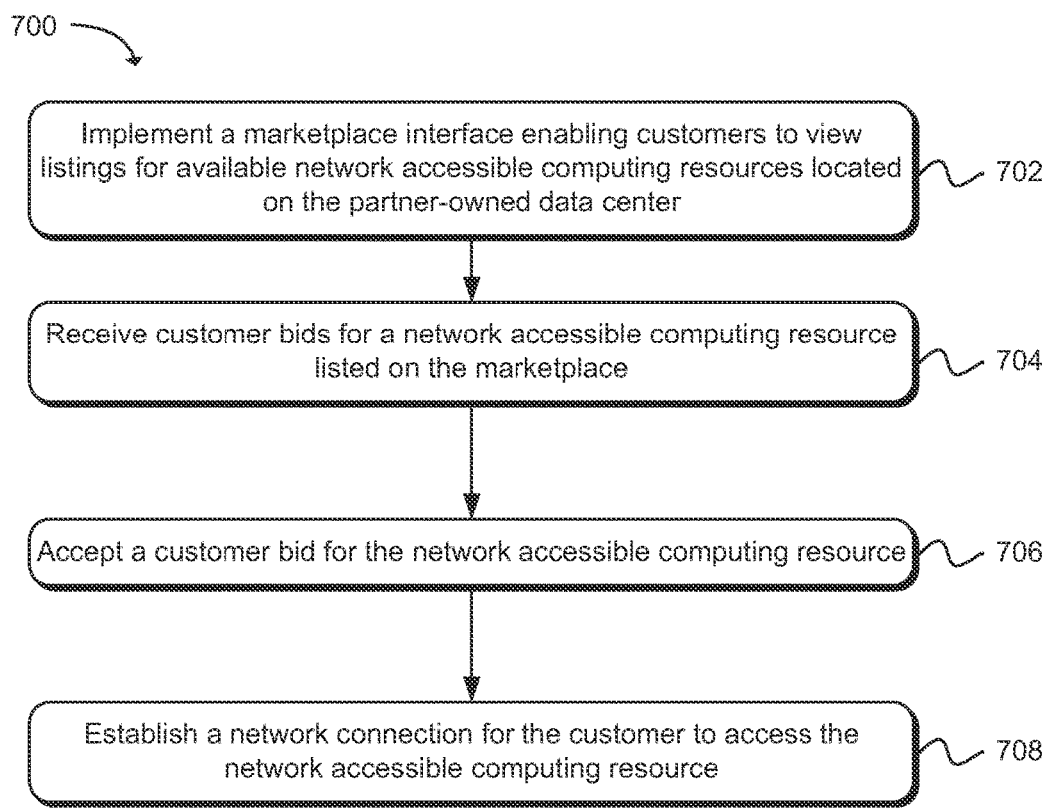
FIG. 7 is a flow diagram illustrating an example method for a network-accessible computing resource market.

FIG. 7 is a flow diagram that illustrates an example method 700 for a marketplace in which a customer may purchase a network-accessible computing resource for a specified term. Beginning in block 702, a marketplace interface may be implemented enabling customers of a computing service provider to view listings for available network-accessible computing resources located on a partner-owned data center. In one example configuration, the marketplace interface may be a GUI implemented by a computing service provider. A customer wishing to purchase a network-accessible computing resource may be able to search for and view network-accessible computing resource listings by way of the marketplace GUI. A listing may describe a network-accessible computing resource (e.g., geographic location, partner information, processor type, memory size, storage size, network capacity, etc.) and any terms and/or conditions associated with the network-accessible computing resource. In one example, a customer may filter search results for network-accessible computing resources by partner, geographical location, terms, utilization availability (e.g., day/night), machine image configurations cached on a partner-owned data center, etc.

As in block 704, customers may submit a monetary bid amount for a network-accessible computing resource listed in the marketplace. In one example, when submitting a bid, a customer may include specifications for a machine image configuration that the customer intends to install on the network-accessible computing resource. Specifying a machine image configuration in combination with a bid may, in one example, put a computing service provider on notice that a customer wishes to install the machine image configuration on the network-accessible computing resource, thus allowing the computing service provider to check whether the machine image configuration is cached on the partner-owned data center, and if not, allow for the machine image configuration to be transferred from a service provider data center to the partner-owned data center.

As in block 706, a customer bid may be accepted for the network-accessible computing resource. For example, a bid system may receive bids submitted by the customers, evaluate the bids and select the highest bid submitted for the network-accessible computing resource. Upon acceptance of the bid, the customer who submitted the winning bid may be notified that the customer's bid was selected. The customer may then complete the transaction as instructed by the computing service provider.

Alternatively, rather than bidding on a network-accessible computing resource, a partner may specify a price for a network-accessible computing resource that the partner would like to receive. The price may be displayed within a listing for the network-accessible computing resource. A customer willing to purchase the network-accessible computing resource may select the listing, agree to the terms and conditions and purchase the network-accessible computing resource.

After completing the transaction to purchase the network-accessible computing resource, as in block 708, a network connection may be established allowing the customer to access the network-accessible computing resource. The network connection may enable a customer to access the network-accessible computing resource by way of a virtual private gateway established on behalf of the customer. In another example, a customer may be connected to a network-accessible computing resource via a dedicated hardware VPN.

Figure 8:
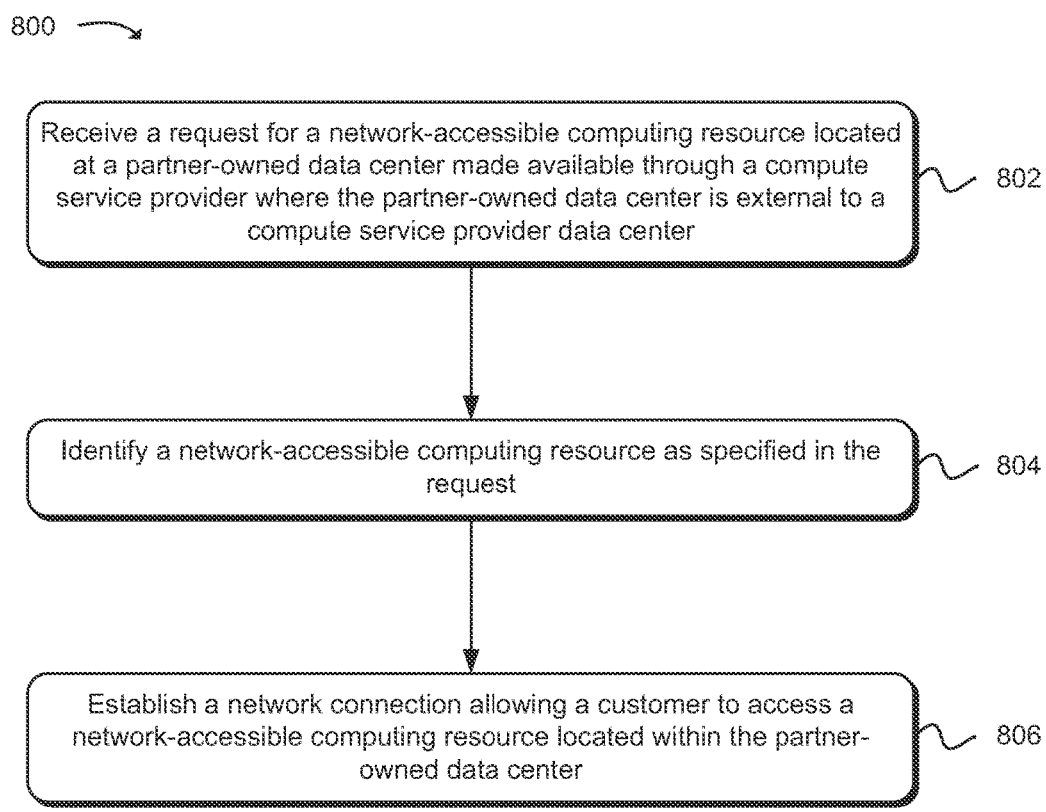
FIG. 8 is a flow diagram illustrating an example method for provisioning a network-accessible computing resource to a customer.

FIG. 8 is a flow diagram illustrating one example method 800 for a hybrid network-accessible computing resource market that makes partner-owned computing resources available to customers of a computing service provider via a computing service network. Beginning in block 802, a request may be received for a network-accessible computing resource located at a partner-owned data center made available through a computing service provider where the partner-owned data center may be external to a computing service provider data center. For example, the network-accessible computing resources may be registered with a service provider network as described earlier, thereby allowing for control of the network-accessible computing resources by way of control interfaces located within the service provider network. The request for the network-accessible computing resource may include a declaration of intent by a customer to execute a service provided by the computing service provider on the network-accessible computing resource.

As in block 804, a network-accessible computing resource may be identified as specified in the request. In one example configuration, the request for the network-accessible computing resource may be made by the customer via a market interface implemented by the computing service provider. The market interface may allow customers to view listings for available network-accessible computing resources located on the partner-owned data center. The market interface may be implemented using an API, a web-based console, a command-line tool, or a graphical user interface. Upon selecting a listing, a network-accessible computing resource associated with the listing may be identified and a machine image configuration may be installed on the network-accessible resource initiating a service offered by the computing service provider.

As in block 806, a network connection allowing a customer access a network-accessible computing resource located within the partner-owned data center may be established. For example, an isolated virtual network may be established between the network-accessible computing resource and the service provider network (e.g., to a customer's virtual private network). Using a client device, a customer may connect to the customer's virtual private network implemented within the computing service network and utilize a service executed by the network-accessible computing resource by way of control operation requests transmitted to the network-accessible computing resource using service provider control interfaces.

Figure 9:
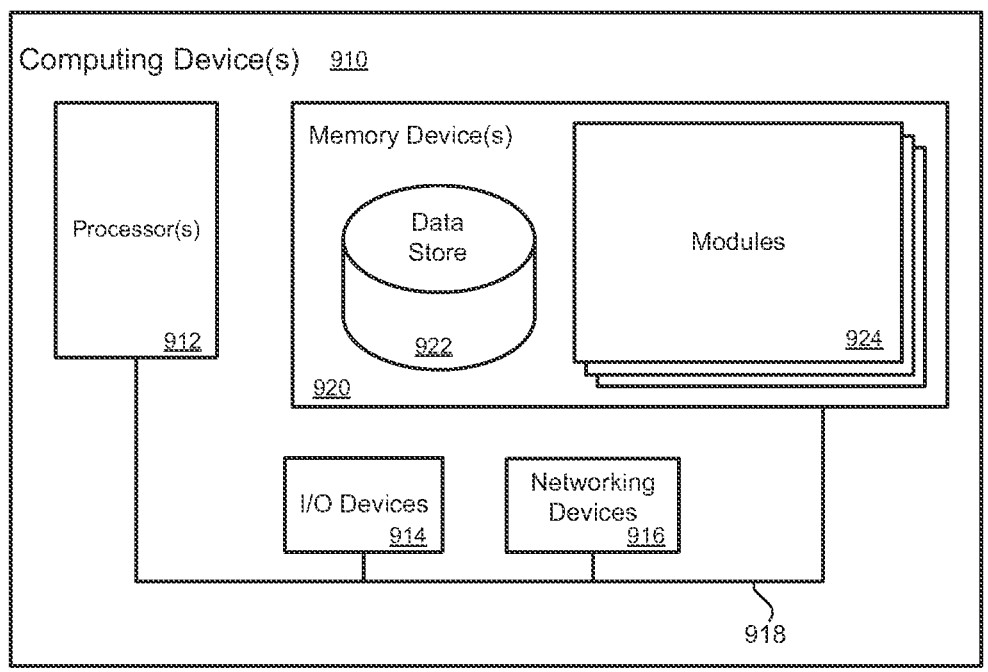
FIG. 9 is block diagram illustrating an example of a computing device that may be used to execute a method for a network-accessible computing resource market.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules that are executable by the processor(s) 912 and data for the modules. Located in the memory device 920 are services and modules 924 executable by the processor. The modules 924 may execute the functions described earlier. The modules 924 may include a partner module, a customer module, a provisioning module and other modules. A data store 922 may also be located in the memory device 920 for storing data related to the modules and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. The I/O devices 914 may be used with the computing device as desired. Networking devices 916 and similar communication devices may be included in the computing device. The networking devices 916 may be wired or wireless networking devices that connect to the Internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer implemented method, comprising:
    under control of one or more computer systems configured with executable instructions,
        registering a network-accessible computing resource located at a partner-owned data center with a service control-plane in a service provider network, wherein the network-accessible computing resource is external to the service provider network and the network-accessible computing resource is partitioned from a remainder of computing resources at the partner-owned data center using a subnet;
        sending a machine image configuration from the service provider network to a destination storage device at the partner-owned data center, wherein the machine image configuration is cacheable on the destination storage device at the partner-owned data center so that the machine image configuration is available for use on the network-accessible computing resource at the partner-owned data center, and the machine image configuration is installable on the network-accessible computing resource to provide a computing service;
        receiving a request for the network-accessible computing resource located at the partner-owned data center, wherein the network-accessible computing resource is made available through a computing service provider;
        identifying the network-accessible computing resource located at the partner-owned data center specified in the request; and
        establishing a control flow path between the service control-plane located in the service provider network and a virtual control plane located in the partner-owned data center, providing access to the network-accessible computing resource located within the partner-owned data center via the service provider network.

2. A method as in claim 1, wherein the machine image configuration, when executed by the network-accessible computing resource, provides one of: a computing instance, a block-level storage service, a storage service implementing a web-services interface for customer operations, a database service, a batch-processing parallel computing service, or a load-balancing service.

3. A method as in claim 1, further comprising using the control flow path to send control operation requests that originate in the service provider network to the network-accessible computing resource located in the partner-owned data center.

4. A method as in claim 1, further comprising enabling a customer of the computing service provider, via a marketplace GUI (Graphical User Interface), to view listings for network-accessible computing resources located at the partner-owned data center and request the network-accessible computing resource associated with one of the listings.

5. A method as in claim 1, wherein receiving the request for the network-accessible computing resource further comprises receiving a bid amount for the network-accessible computing resource from a customer of the computing service provider.

6. A method as in claim 1, wherein receiving the request for the network-accessible computing resource further comprises receiving specifications for the machine image configuration to install as the computing service on the network-accessible computing resource.

7. A method as in claim 1, wherein identifying the network-accessible computing resource as specified in the request further comprises identifying terms of a customer-partner relationship associated with the network-accessible computing resource that include a specified duration of the customer-partner relationship.

8. A method as in claim 1, wherein the network-accessible computing resource located at the partner-owned data center further comprises a network-accessible computing resource having a utilization time that is divided between a first customer and a second customer of the computing service provider.

9. A method as in claim 1, further comprising reserving storage resources in the partner-owned data center to support data processing and data transfer operations associated with the network-accessible computing resource utilized by a customer of the computing service provider.

10. A method as in claim 1, further comprising identifying that the network-accessible computing resource meets specified compliance standards as verified by the computing service provider.

11. A method as in claim 1, further comprising establishing a virtual private network dedicated to network traffic associated with control commands between the service provider network and the partner-owned data center.

12. A method as in claim 1, further comprising securing the control flow path using one of: IPSec (Internet Protocol Security), TLS (Transport Layer Security), or SSL (Secure Sockets Layer).

13. A method as in claim 1, further comprising securing the control flow path using an encryption-based protocol and isolating control traffic from data traffic.

14. A system, comprising:
a processor;
a memory device including instructions that, when executed by the processor, cause the system to:
register a network-accessible computing resource located at a partner-owned data center with a service control-plane in a service provider network, wherein the network-accessible computing resource is external to the service provider network and the network-accessible computing resource is partitioned from a remainder of computing resources at the partner-owned data center;
send a machine image configuration from the service provider network to a destination storage device at the partner-owned data center, wherein the machine image configuration is cacheable on the destination storage device at the partner-owned data center, making the machine image configuration available for execution on the network-accessible computing resource at the partner-owned data center, and the machine image configuration is installable on the network-accessible computing resource to provide a computing service;
receive a request from a customer of a computing service provider for the network-accessible computing resource located at the partner-owned data center;
identify the network-accessible computing resource located within the partner-owned data center along with terms of a customer-partner relationship associated with the network-accessible computing resource, wherein the terms include a specified duration of the customer-partner relationship; and
establish a control flow path between the service control-plane located in the service provider network and a virtual control plane located in the partner-owned data center enabling the customer to access the network-accessible computing resource via the service provider network.

15. A system as in claim 14, wherein the memory device includes instructions that, when executed by the processor, causes the system to receive a bid amount for the network-accessible computing resource located at the partner-owned data center from a computing service provider customer.

16. A system as in claim 15, wherein the bid amount for the network-accessible computing resource is subject to terms of a customer-partner relationship specifying a duration of the customer-partner relationship.

17. A system as in claim 14, wherein the memory device includes instructions that, when executed by the processor, causes the system to establish a virtual private network dedicated to encrypted network traffic associated with control commands between the service provider network and the partner-owned data center.

18. A non-transitory machine readable storage medium having instructions embodied thereon, the instructions when executed by a processor:
register a network-accessible computing resource located at a partner-owned data center with a service control-plane in a service provider network, wherein the network-accessible computing resource is external to the service provider network and the network-accessible computing resource is partitioned from a remainder of computing resources at the partner-owned data center;
send a machine image configuration from the service provider network to a destination storage device at the partner-owned data center, wherein the machine image configuration is cacheable on the destination storage device at the partner-owned data center, making the machine image configuration available for execution on the network-accessible computing resource at the partner-owned data center, and the machine image configuration is installable on the network-accessible computing resource to provide a computing service;
receive a request and a bid amount from a customer of a computing service provider for the network-accessible computing resource located at the partner-owned data center, the network-accessible computing resource being made available through the computing service provider to provide the computing service, and the bid amount for the network-accessible computing resource being subject to terms of a customer-partner relationship specifying a duration of the customer-partner relationship;
identify the network-accessible computing resource located within the partner-owned data center along with terms of a customer-partner relationship associated with the network-accessible computing resource, wherein the terms include a specified duration of the customer-partner relationship; and
establish a control flow path between the service control-plane located in the service provider network and a virtual control plane located in the partner-owned data center, enabling a customer of the computing service provider having an accepted bid amount to access the network-accessible computing resource via the service provider network.

19. A non-transitory machine readable storage medium as in claim 18, further comprising instructions that when executed by the processor receive specifications for the machine image configuration to install as the computing service on the network-accessible computing resource.

20. A non-transitory machine readable storage medium as in claim 18, further comprising instructions that when executed by the processor initiate a marketplace interface that allows customers of the computing service provider to submit the bid amount for the network-accessible computing resource located at the partner-owned data center.

* * * * *